United States Patent
Biran et al.

(10) Patent No.: US 7,234,017 B2
(45) Date of Patent: Jun. 19, 2007

(54) COMPUTER SYSTEM ARCHITECTURE FOR A PROCESSOR CONNECTED TO A HIGH SPEED BUS TRANSCEIVER

(75) Inventors: Giora Biran, Zichron-Yaakov (IL); Matthew Adam Cushing, Rochester, MN (US); Robert Allen Drehmel, Goodhue, MN (US); Allen James Gavin, Rochester, MN (US); Mark E. Kautzman, Colchester, VT (US); Jamie Randall Kuesel, Rochester, MN (US); Ming-I Mark Lin, South Burlington, VT (US); David Arnold Luick, Rochester, MN (US); James Anthony Marcella, Rochester, MN (US); Mark Owen Maxson, Mantorville, MN (US); Eric Oliver Mejdrich, Rochester, MN (US); Adam James Muff, Rochester, MN (US); Clarence Rosser Ogilvie, Huntington, VT (US); Charles S. Woodruff, Charlotte, VT (US)

(73) Assignee: International Business Machines Corporation, Armonk, NY (US)

(*) Notice: Subject to any disclaimer, the term of this patent is extended or adjusted under 35 U.S.C. 154(b) by 132 days.

(21) Appl. No.: 11/064,745

(22) Filed: Feb. 24, 2005

(65) Prior Publication Data
US 2006/0190668 A1    Aug. 24, 2006

(51) Int. Cl.
G06F 13/36    (2006.01)
(52) U.S. Cl. ............... 710/315; 710/314; 710/313; 710/305; 709/311; 709/320
(58) Field of Classification Search ........ 710/305–315; 709/311–315, 319, 328; 712/16–22, 36, 712/38
See application file for complete search history.

(56) References Cited

U.S. PATENT DOCUMENTS

| | | | |
|---|---|---|---|
| 4,281,381 A | 7/1981 | Ahuja et al. | |
| 5,038,346 A | 8/1991 | Courtois | |
| 5,546,546 A | 8/1996 | Bell et al. | |
| 5,581,705 A | 12/1996 | Passint et al. | |
| 5,740,409 A | 4/1998 | Deering | |
| 5,778,096 A | 7/1998 | Stearns | |
| 5,835,739 A * | 11/1998 | Bell et al. ................. | 710/309 |
| 5,841,971 A | 11/1998 | Kessler et al. | |
| 5,893,151 A | 4/1999 | Merchant | |
| 6,021,451 A | 2/2000 | Bell et al. | |
| 6,124,868 A | 9/2000 | Asaro et al. | |
| 6,247,086 B1 | 6/2001 | Allingham | |

(Continued)

OTHER PUBLICATIONS

John L. Hennessy et al., *Computer Architecture: A Quantitative Approach*, Second Edition, Chapter 8: Multiprocessors, Morgan Kaufmann Publishing, pp. 638-639 and 680 (1996).

Primary Examiner—Khanh Dang
Assistant Examiner—Raymond N Phan
(74) Attorney, Agent, or Firm—Martin & Associates, LLC; Derek P. Martin

(57) ABSTRACT

A high speed computer processor system has a high speed interface for a graphics processor. A preferred embodiment combines a PowerPC microprocessor called the Giga-Processor Ultralite (GPUL) 110 from International Business Machines Corporation (IBM) with a high speed interface on a multi-chip module.

32 Claims, 7 Drawing Sheets

U.S. PATENT DOCUMENTS

| | | |
|---|---|---|
| 6,363,438 B1 | 3/2002 | Williams et al. |
| 6,405,276 B1 | 6/2002 | Chen et al. |
| 6,449,699 B2 | 9/2002 | Franke et al. |
| 6,571,308 B1 * | 5/2003 | Reiss et al. ............... 710/315 |
| 6,668,309 B2 | 12/2003 | Bachand et al. |
| 6,694,383 B2 | 2/2004 | Nguyen et al. |
| 6,725,296 B2 | 4/2004 | Craddock et al. |
| 6,799,317 B1 * | 9/2004 | Heywood et al. ........... 719/313 |
| 6,801,207 B1 | 10/2004 | Tischler et al. |
| 6,801,208 B2 | 10/2004 | Keshava et al. |
| 6,816,161 B2 | 11/2004 | Lavelle et al. |
| 6,820,143 B2 | 11/2004 | Day et al. |
| 6,820,174 B2 | 11/2004 | Vanderwiel |
| 6,889,284 B1 | 5/2005 | Nizar et al. |
| 6,978,319 B1 * | 12/2005 | Rostoker et al. ............ 709/250 |
| 6,985,988 B1 * | 1/2006 | Nsame ....................... 710/305 |
| 2004/0117592 A1 | 6/2004 | Day et al. |
| 2004/0156199 A1 | 8/2004 | Rivas et al. |
| 2004/0162946 A1 | 8/2004 | Day et al. |
| 2004/0168011 A1 | 8/2004 | Hemming |
| 2004/0263519 A1 | 12/2004 | Andrews et al. |
| 2006/0069788 A1 * | 3/2006 | Blackmore et al. ......... 709/230 |

* cited by examiner

COMPUTER SYSTEM ARCHITECTURE FOR A PROCESSOR CONNECTED TO A HIGH SPEED BUS TRANSCEIVER

RELATED APPLICATIONS

The present application is related to the following co-filed applications, which are incorporated herein by reference:

"Method and System for Ordering Requests at a Bus Interface", Ogilvie et al., Ser. No. 11/64728, co-filed herewith;

"Data Ordering Translation Between Linear and Interleaved Domains at a Bus Interface", Horton et al., Ser. No. 11/064569, co-filed herewith;

"Method and System for Controlling Forwarding or Terminating of a Request at a Bus Interface Based on Buffer Availability", Ogilvie et al., Ser. No. 11/064570, co-filed herewith;

"Computer System Bus Bridge", Biran et al., Ser. No. 11/064568, co-filed herewith;

"Apparatus and Method for Transaction Tag Mapping Between Bus Domains", Kautzman et al., Ser. No. 11/064567, co-filed herewith;

"Transaction Flow Control Mechanism for a Bus Bridge", Ogilvie et al., Ser. No. 11/064722, co-filed herewith; and "Pipeline Bit Handling Circuit and Method for a Bus Bridge", Drehmel et al., Ser. No. 11/064744, co-filed herewith.

BACKGROUND OF THE INVENTION

1. Technical Field

This invention generally relates to computer systems, and more specifically relates to a computer system architecture.

2. Background Art

Computer processors and computer systems are constantly evolving and improving. Ever faster computer processor systems are needed in the computer gaming industry to provide continued improvement in gaming performance. The PowerPC microprocessor is produced by International Business Machines Corporation (IBM). A newer and faster version of the PowerPC is known as the Giga-Processor Ultralite (GPUL). The GPUL processor core from International Business Machines Corporation (IBM) is also called the IBM PowerPC 970FX RISC microprocessor. The GPUL provides high performance processing by manipulating data in 64-bit chunks and accelerating compute-intensive workloads like multimedia and graphics through specialized circuitry known as a single instruction multiple data (SIMD) unit.

The computer gaming industry has a need for a high speed processor such as the GPUL with a high speed interface that can readily interface with a graphics processor. Without a higher speed interface connection the computer gaming industry will not be able to continue to offer continuing quality improvements to the computer gaming experience.

DISCLOSURE OF INVENTION

The present invention provides a high speed computer processor system with a high speed interface for a graphics processor. A preferred embodiment combines a GPUL PowerPC microprocessor from International Business Machines Corporation (IBM) with a high speed interface on a multi-chip module. Embodiments are directed to a computer processor system for the computer gaming industry.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
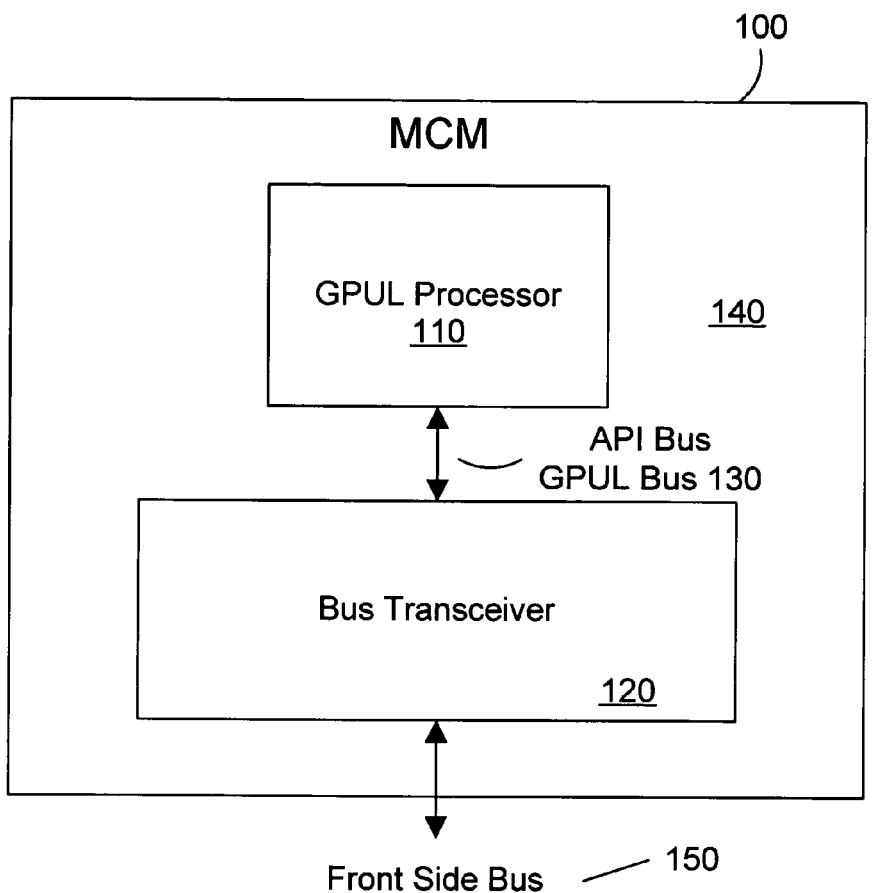
FIG. 1 is a block diagram of a computer system in accordance with the preferred embodiments.

FIG. 1 illustrates a block diagram of a computer processor system 100 according to a preferred embodiment. The computer processor system 100 includes a Giga-Processor Ultralite (GPUL) 110 for the central processing unit. The GPUL is connected to an ASIC bus transceiver 120 with a GPUL bus 130. The illustrated embodiment shows a single GPUL processor 110 but it is understood that multiple processors could be connected to the GPUL bus 130. The GPUL 110 and the ASCI bus transceiver 120 are interconnected on a Multi-Chip Module (MCM) 140. In other embodiments (not shown) the processor(s) and the transceiver are integrated on a single chip. Communication with the computer system 100 is provided over a Front Side Bus (FSB) 150. The FSB can be connected to a graphics processor (not shown).

In the preferred embodiment, the GPUL is a prior art processor core from International Business Machines Corporation (IBM) called the IBM PowerPC 970FX RISC microprocessor. The GPUL provides high performance processing by manipulating data in 64-bit chunks and accelerating compute-intensive workloads like multimedia and graphics through specialized circuitry known as a single instruction multiple data (SIMD) unit. The GPUL processor incorporates a GPUL bus 130 for a communications link. The GPUL bus 130 is also sometimes referred to as the API bus, the PowerPC 970FX interface bus, or the PI bus (in the PowerPC's specifications). This document primarily uses the term API bus, but these other terms are essentially interchangeable. The API bus runs at speeds up to 900 megahertz to deliver information to the processor at up to 6.4 gigabytes per second. In an illustrated embodiment, the API bus 130 is connected to a bus transceiver 120. Published information is available about the GPUL processor 110 from various sources including IBM's website.

Figure 2:
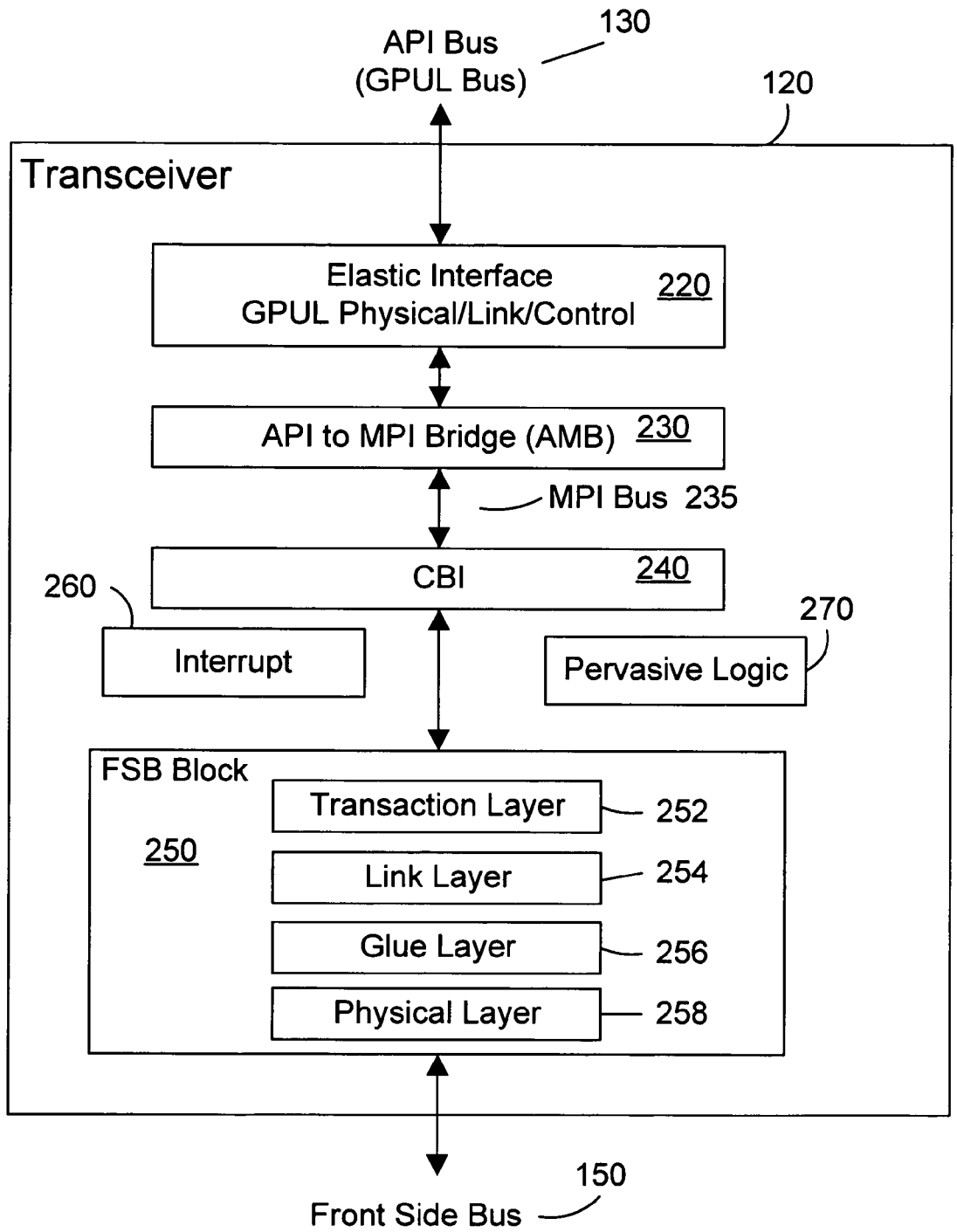
FIG. 2 is a block diagram of the bus transceiver shown in the computer system of FIG. 1.

FIG. 2 illustrates a block diagram of the bus transceiver 120 according to preferred embodiments. The bus transceiver 120 includes an elastic interface 220 that is the physical/link/control layer for the transceiver connection to the GPUL processor over the API bus 130. The elastic interface is connected to the API to MPI Bridge (AMB) 230. The AMB provides protocol conversion between the MPI bus 235 and the API bus 130 protocols. The MPI bus 235 connects the AMB to the Common Bus Interface (CBI) block 240. The CBI connects to the Front Side Bus (FSB) block 250. The FSB block provides I/O connections for the bus transceiver 120 to the Front Side Bus (FSB) 150. The FSB block 250 includes a transaction layer 252, a link layer 254, a glue layer 256 and a physical layer 258. The bus transceiver 120 also includes an interrupt block 260, and a pervasive logic block 270. Each of these blocks in bus transceiver 120 is described further in the paragraphs below.

Elastic Interface

Figure 3:
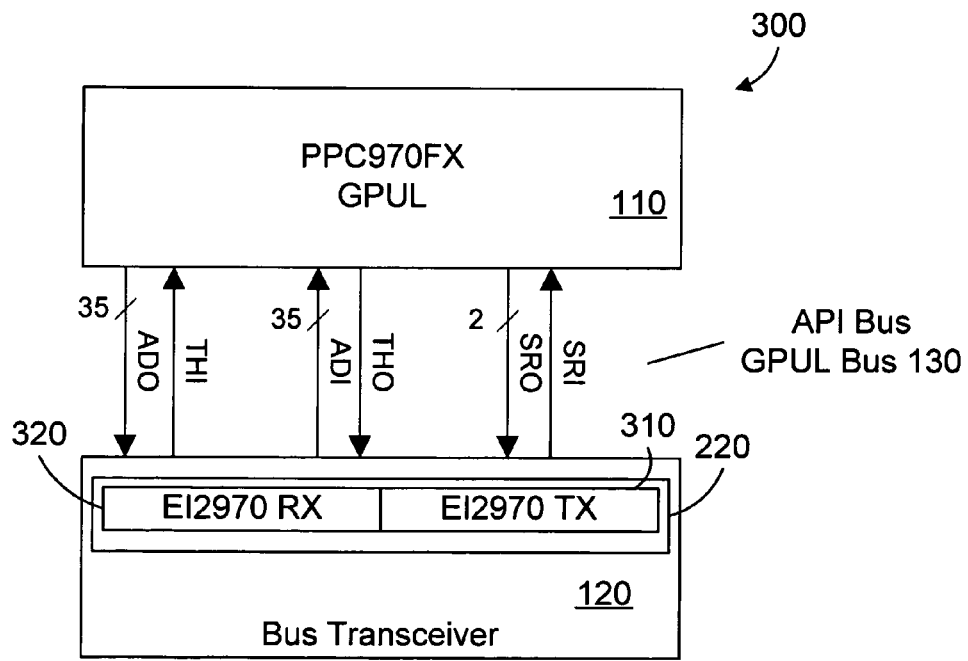
FIG. 3 is a block diagram of the interface between the bus transceiver and the processor in accordance with the preferred embodiments.

FIG. 3 further illustrates the elastic interface 220 introduced with reference to FIG. 2. The Elastic Interface 220 is a high-speed source synchronous serial communications bus. The Elastic Interface 220 is compatible with the GPUL (PPC970) processor's elastic interface physical layer, providing a low latency serializer/deserializer per-channel deskew functionality between the processor 110 and the bus transceiver 120.

The Elastic Interface 220 provides the connection of the bus transceiver 120 with the PowerPC 970 Processor Interconnect bus or GPUL bus 130. The GPUL bus 130 is a set of unidirectional, point-to-point bus segments. The bus segments include two, one in each direction, 35-bit address/data (ADO/ADI) segments, two 1-bit transfer handshake segments (THO/THI), and two 2-bit snoop response segments (SRO/SRI). The bus also implements single error correct/double error detect (SEC/DED) ECC. The GPUL bus 130 is implemented with EI2970 cores available from IBM. The EI2970 consists of two sets of cores which support a 48 data channel per media clock configuration. EI2970TX 310 provides the transmitter physical layer functionality and the EI2970RX 320 provides the receiver physical layer functionality. The Elastic Interface EI2970 cores 310, 320 contain two major interfaces. The first is the high-speed media interface, which consists of 48 single ended data channels, and a source synchronous phase-aligned double-data rate (DDR) differential clock. The second interface is the local interface, which operates at the same frequency of the high-speed media interface, but may be not be phase aligned with the high-speed media interface. EI2970TX samples 96 bits of data at the local clock interface, then conducts a 2-to-1 serialization of this data, and places it on the high-speed media interface with a DDR phase-aligned clock.

The EI2970RX core 320 provides support for up to one bit time of per data channel deskew and optimal data-eye sampling with periodic drift compensation. This core then deserializes the received data to provide 96 bits of data aligned to the RX chips local clock with predictable user controlled latency. The EI2970RX core 320 provides support for receiving multiple types of training patterns to support both EI1 and EI2 training protocols. The EI2970RX core 320 also provides extensive diagnostic information such as per-bit deskew information and the ability to detune the interface to access link margins. The Elastic interface 220 is designed to operate at up to 1.5 Gbps per-channel maximum data rate over 13 cm FR4 plus a connector. In a preferred embodiment, the Elastic interface 220 operates at 500 Mbps per-channel over a short distance on the MCM 100.

AMB (Bus Bridge)

Figure 4:
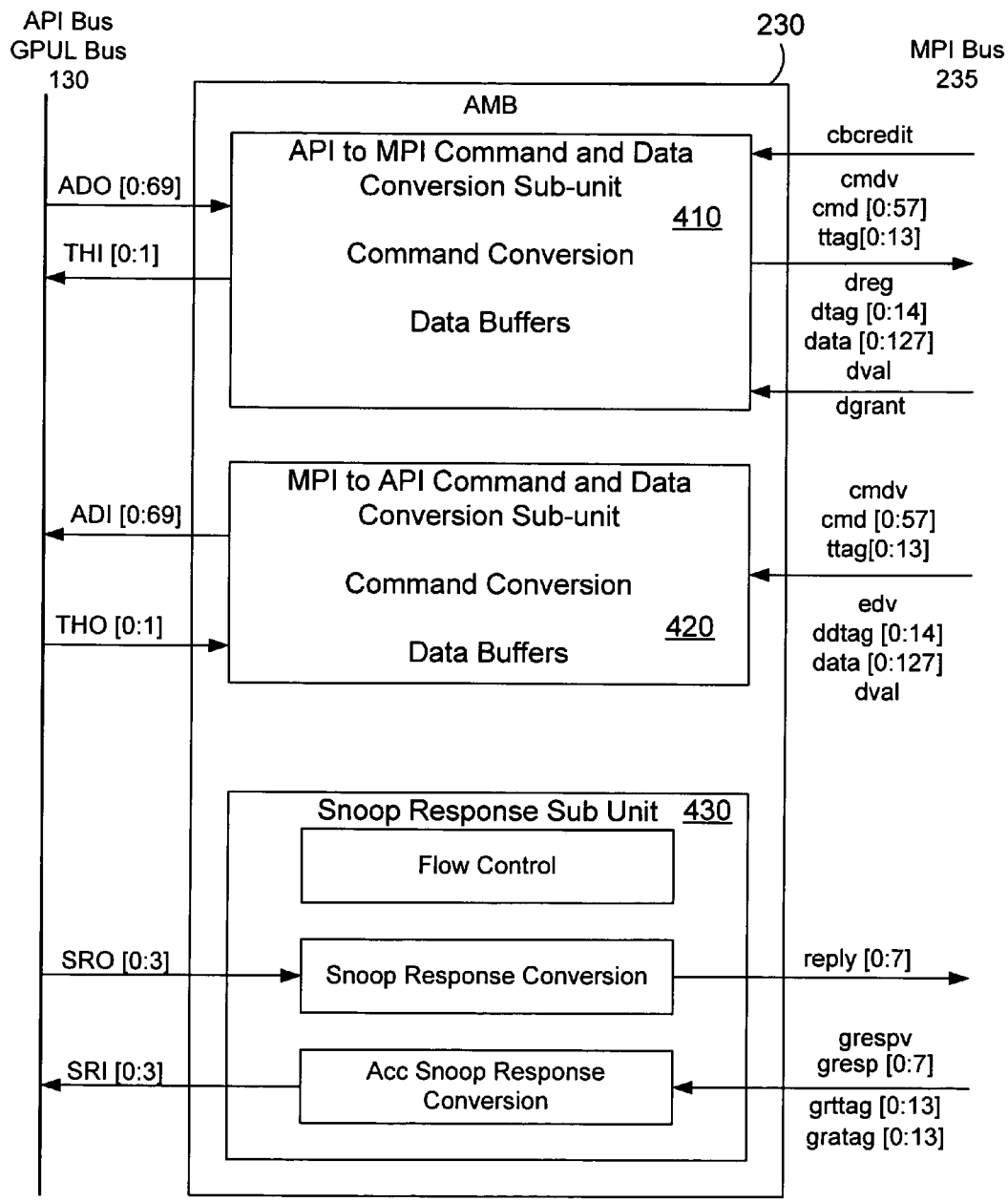
FIG. 4 is a block diagram of the API to MPI Bridge in accordance with the preferred embodiments.

FIG. 4 shows a block diagram of the AMB 230 shown in FIG. 2. The AMB 230 is the conversion logic between the API bus 130 and MPI bus 235. The AMB 230 transfers commands, data, and coherency snoop transactions back and forth between the Elastic interface 220 and the CBI 240. The AMB 230 is made up of 3 sub-units: the API to MPI Command and Data Conversion sub unit 410, the MPI to API Command and Data Conversion sub unit 420 and the Snoop Response sub unit 430. The primary function of each sub unit is to convert the appropriate commands, data, and snoop responses from the API bus to the MPI bus and from the MPI bus to the API bus.

CBI

Figure 5:
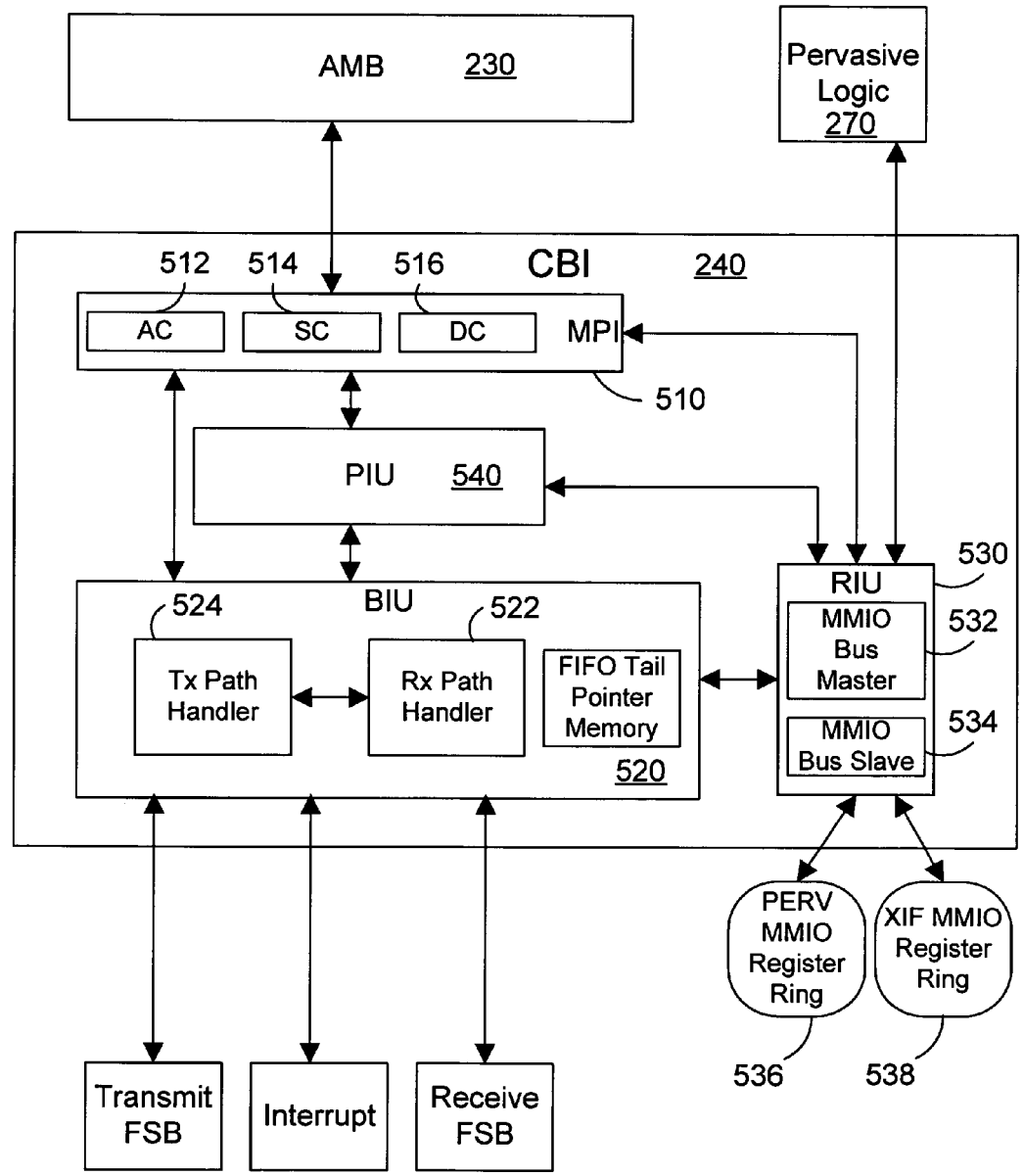
FIG. 5 is a block diagram of the CBI in accordance with the preferred embodiments.

FIG. 5 shows a block diagram of the CBI block introduced with reference to FIG. 2. The Common Bus Interface (CBI) 240 is responsible for communications between the AMB 230 and the rest of the transceiver 120. The additional task is to enable the Pervasive logic 270 to access MMIO-mapped components all over the chip. The CBI 240 acts as a bridge between the following components: the AMB 230, the FSB 150, the FiTP memory, the Pervasive logic 270, the interrupt handler unit 260, and the MMIO rings. The CBI includes an MPI Unit (MPI) 510, a Bus Interface Unit (BIU) 520, a Register Interface Unit (RIU) 530, and a Pervasive Interface Unit (PIU) 540. Each of these components of the CBI 240 are described further below.

MPI

The multiprocessor interface (MPI) 510 includes an Address Concentrator (AC) 512, a Snoop Concentrator (SC) 514 and a Data Control block (DC) 516. The address concentrator 512 is part of the MPI bus. Its responsibility is to manage flow control via a credit-based system and arbitrate between masters on the bus. Commands are queued in the AC 512 and selected for reflection to all devices on the bus. PAAM function is supported. The snoop concentrator 514 is responsible for combining the replies from all slave units into a combined response which it then reflects to all units on the bus. The data control block 516 is responsible for generating the control signals along with the data bus delivered to the agents of the MPI bus. This logic is simplified by the fact that there are only two devices on the bus. It is assumed that both devices have sole access to drive data on their respective data out busses.

BIU

The Bus Interface Unit (BIU) 520 handles processing of commands originated by PMW, FSB, and INTS units. The BIU is divided into a receive path with a Rx path handler 522 and a transmit path with a Tx path handler 524. The Rx Path Handler 522 handles packets from the receive part of FSB-APP. The supported commands are store requests, load requests, flush requests, read responses, and interrupt requests. The Tx Path Handler 524 is responsible for accepting Reflected Command commands from the MPI unit, issuing a Snoop Reply and then issuing relevant commands on the FSB-APP interface, receiving requests from the BIU Rx partition in order to schedule Flush Acks towards the FSB-APP interface, receiving requests from the Interrupt Control unit located in the BIU Rx partition, and issuing End Of Interrupt (EOI) towards FSB-APP interface. The Tail Pointer Memory (FiTP) contains 16 entries of four bytes each. These storage elements are mapped to 16 consecutive 128-byte aligned addresses in the memory map. The four bytes are considered to be the most significant four bytes of the cache line. Stores that effect any other section of the cache line will be lost because there will be no storage for the data.

RIU

The register interface unit (RIU) 530 is responsible for accepting Read/Write commands from the pervasive unit and delivering them on the respective register ring. The RIU includes a MMIO bus master 532, and a MMIO bus slave 534. Two rings are supported by the RIU, the PERV register ring 536, and the XIF register ring 538 (used also for access of security memories). The RIU is also responsible for gathering any data responses and providing the data back to the command originator. The MMIO Bus Master Unit 532 is responsible for accepting commands originated by either PMW or PERV, and arbitrating between them and issue the winning request to the MMIO ring. Upon receiving a response from the ring, this unit provides buffering facility for data responses (in case of a Load command) and delivers results back to the originator. There is only one outstanding request traveling through the ring. The MMIO Bus Slave Unit 534 is an agent of the MMIO Byte Bus ring. It serves as a bridge between the MMIO Bus Master Unit and the respective MMIO components (registers/memories).

PIU

The processor interface unit (PIU) 540 is responsible for providing the following pervasive functions: RAS (Reliability, Availability, and Serviceability) information, trace bus handler, scan structures, LBIST/ABIST, configuration ring, CBI MMIO mapped registers and LBIST satellite. The PIU 540 includes a RAS Support Unit (Reliability, Availability, and Serviceability). RAS defines a method for error detection, error isolation, and error handling on the CPU SoC. The PIU 540 also includes a debug bus support Unit for the performance monitor/trace bus (trace bus). The Trace Bus carries data (64 bits) which may be captured in the trace array of the Trace Logic Analyzer for subsequent analysis. The event bus (four bits) carries additional single-bit error or critical event flags, that may be stored as auxiliary data along with the trace data in the trace arrays. The trigger bus (four bits) carries four signals used to control operation of the logic analyzer.

FSB Block

As briefly introduced above, the FSB block provides I/O connections for the bus transceiver 120 to the Front Side Bus (FSB) 150. The FSB block 250 as show in FIG. 2 includes a transaction layer 252, a link layer 254, a glue layer 256 and a physical layer 258.

The FSB block link layer 254 is responsible for flow control between two devices on the FSB and provides the transaction layer 252 or protocol layer with functions allowing for the shared use of the physical link. The transaction layer is responsible for the higher level communication between devices for cache coherence, ordering and interrupt deliver. The transaction layer uses a packet based protocol for communications.

Figure 6:
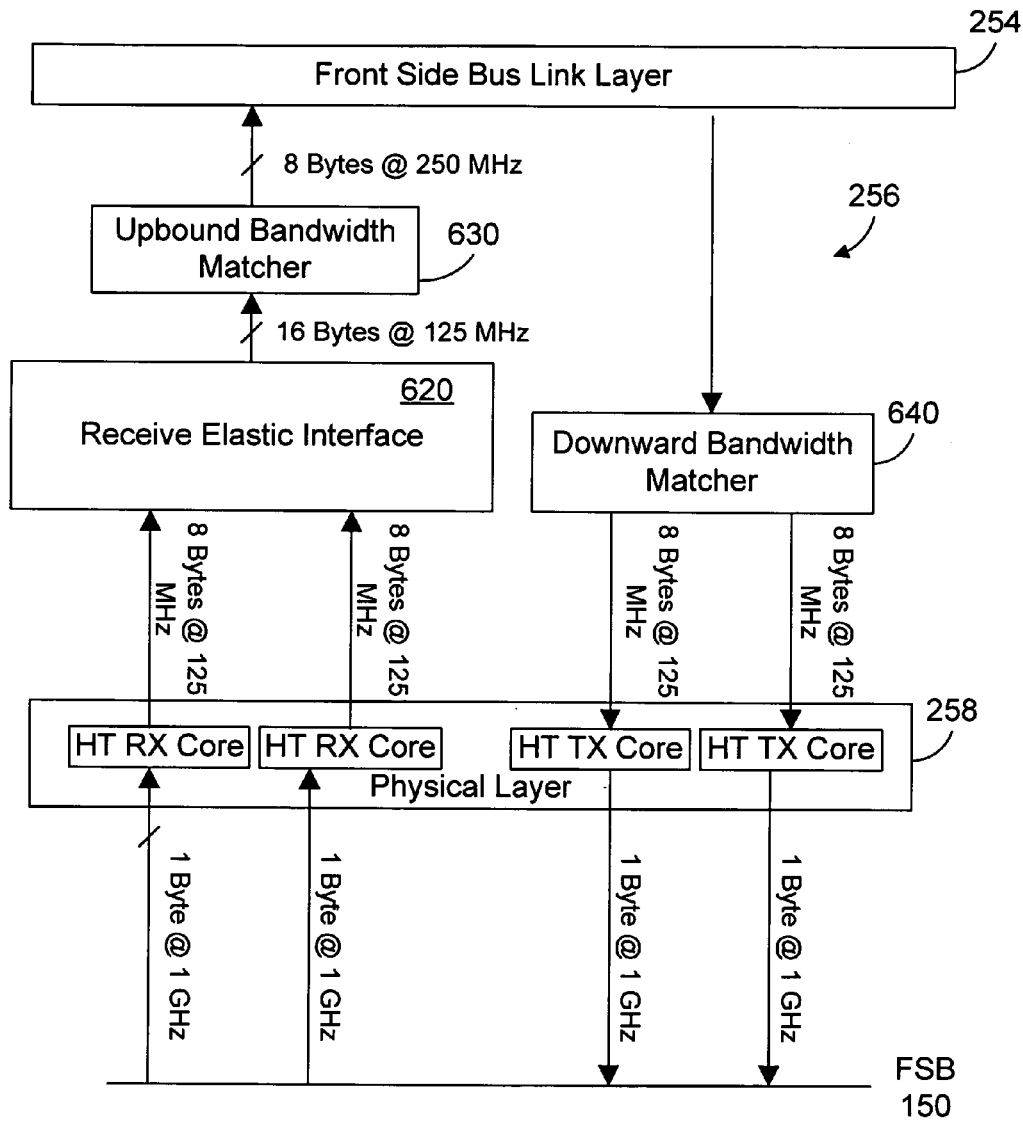
FIG. 6 is block diagram of the Front Side Bus (FSB) block in accordance with the preferred embodiments.

FIG. 6 illustrates further detail of the FSB block 254. The FSB glue layer 256 provides the connection between the FSB link layer 254 and the FSB physical layer 258. The FSB glue layer 256 provides an asynchronous interface and bandwidth matching hardware for high-speed data coming to/from the FSB physical layer 258 and interfacing with the Front Side Bus logic in the FSB link layer 254.

The FSB physical layer 258 utilizes the Hyper Transport (HT) 1.6 Gbps Physical Layer ASIC available from IBM. In the preferred embodiment, the HT cores are compliant with the HyperTransport I/O Link Specification, Revision 1.5, available from the Hypertransport organization and their website. The transceiver 126 utilizes the HT for a physical HT link, but does not utilize the protocols of the prior art HT. The protocols used are novel to the FSB. Details of the ASIC cores can be found in the HyperTransport 1.6 Gbps Physical Layer Core Data book available from IBM. The bus transceiver's requirements for the serial data link of the HT require operation at 1.0 Gbps, or 1.0 GHz.

The HyperTransport 1600 family of cores are used together to implement the FSB physical layer with a Hyper-Transport link operating at up to 1600 Mbps (800 MHz double data rate). Each link is made up of two unidirectional point-to-point connections, one in each direction. Each connection is made up of 2 to 32 control/address/data signals, one framing signal, and one clock. A HyperTransport link is comprised of: one to four HT16XMIT00 cores on each end, one to four HT16RCV00 cores on each end, one PLL8SFLDCD that provides the bit and word clocks, and a BHYPTCAL I/O cell impedance reference and one ZCNTL-BIN6 core controller for the I/O circuit impedance control. Upon power up, HyperTransport nodes negotiate to operate at the highest frequency and widest width that are common to the connected transmitter and receiver. Unused inputs must be tied to logic 0.

FIG. 6 further illustrates the data flow using the Hyper Transport Link (HT link) to the FSB physical layer 258 of the transceiver 120. Input data across the HT link is two bytes of serial data @ 1.0 GHz[RxCAD], along with one bit of control[RxCTL] and clock[RxCLK] signals (not shown). The serial input data and control signals are demuxed by the physical layer 258 at an 8:1 ratio, and are synchronous to the rising edge of the HT Rx core output clock RxWLNKCLK. The frequency of RxWLNKCLK is derived from RxCLK and has a frequency ⅛ of RxCAD[7:0] data rate. The format of the deserialized output data is eight bytes of de-serialized data @ 125 MHz for each of two HT Rx cores, or sixteen bytes @ 125 MHz for the entire link. The asynchronous interface logic takes the HT Rx core RxWLNKCAD[127:0] output data and RxWLNKCTL[15:0] control signals, based on the 125 MHz RxWLNKCLK and synchronizes them to the 125 MHz clock domain on the GPUL processor 110, as the two clocks may be out-of-phase with one another. The output data from this partition is the same width and clocked at the same frequency as the input data and is sent to the bandwidth matching logic. The bandwidth matching logic takes the sixteen bytes of data, clocked @ 125 MHz and converts it to eight bytes of data clocked @ 250 Mhz. It does this by use of a single toggle signal that inverts itself every 250 MHz clock cycle, and alternating between reading the odd eight bytes and even eight bytes of the input data, along with the even eight bits and odd eight bits of the control signals, which are connected to the Front Side Bus Interface.

The FSB Glue layer 256 is not responsible for any byte-to-byte- or core-to-core alignment of the incoming data between from the HT Rx cores. Alignment of the data is the responsibility of the link layer logic in the Front Side Bus.

Again referring to FIG. 6, the FSB glue layer 256 includes a Receive Elastic interface (RELAS) 620. The RELAS is an asynchronous interface logic implemented in three distinct sections. First, a Circular Buffer performs the asynchronous handshake between out-of-phase 125 MHz clock domains. Second, a write pointer defines the input data entry this circular buffer is to be filled with from the HT Rx core. And third, a read pointer defines the output data entry for this circular buffer. The RELAS Read Pointer performs the reading of data, control from circular buffer output. Each byte of RxWLNKCAD[63:0] and it corresponding RxWLNKCTL[7:0] bit coming into the RELAS are written into it's corresponding circular buffer based on the value of the write pointer, which is incremented every RxWLNK-CLK 125 Mhz clock cycle. Once the data is written into a buffer entry, the entry is marked valid, and the valid is double latched—clocked by the CPU's 125 MHz clock, starting the asynchronous handshake—and sent to the RELAS read pointer. The RELAS read pointer will initiate a data read out from all the circular buffers in the same clock cycle once all circular buffers have reported to the read pointer that they have a valid data entry. The RELAS read pointer will then send a pulse back to the circular buffer signaling to the circular buffer that it can clear the data entry specified by that instances circular buffer read pointer, ending the asynchronous handshake. Due to the matched frequencies of the clocks on each side of the asynchronous interface, each circular buffer could theoretically be designed with a depth of only one entry. However, for debug purposes, each circular buffer may be designed for a depth of more than one entry, such as eight entries.

The RELAS 620 is connected to the upbound bandwidth matcher 630. The upbound bandwidth matcher logic that lies between the RELAS 620 and the FSB link layer 254 is designed to take sixteen bytes of data @ 125 MHz and manipulate the data to comply with the FSB input format of eight bytes of data @ 250 MHz. The upbound data bandwidth matcher 630 uses a simple toggle mechanism to alternate between reading the even and odd bytes of the input data. On the first 250 MHz cycle the even bytes are latched and placed onto the output bus to the Front Side Bus Logic. The toggle mechanism is clocked by the 250 MHz clock to match the front side bus interface.

The FSB glue layer 256 includes a downbound data bandwidth matcher 640. The bandwidth matcher logic that lies between the FSB link layer 254 and the HT Tx cores in the FSB physical layer 258 is designed to take eight bytes of data @ 250 MHz and manipulate the data to comply with the HT Tx cores input format of sixteen bytes of data @ 125 MHz. Since the two clocks are synchronous to one another, no asynchronous interfaces are required between the FSB and the HT Tx cores. The downbound data bandwidth matcher 640 uses a similar toggle mechanism as its upbound equivalent, using a 250 MHz latch to alternate between reading the even and odd bytes of the input data. On the first 250 MHz cycle the even bytes are latched and placed into a holding register. On the next cycle the odd bytes are sampled from the input bus and placed onto its respective HT Tx core's TxCAD bus, along with the even bytes from the hold register. The toggle mechanism is clocked by the 250 MHz clock to match the speed of the incoming Front Side Bus data.

Pervasive Logic

Figure 7:
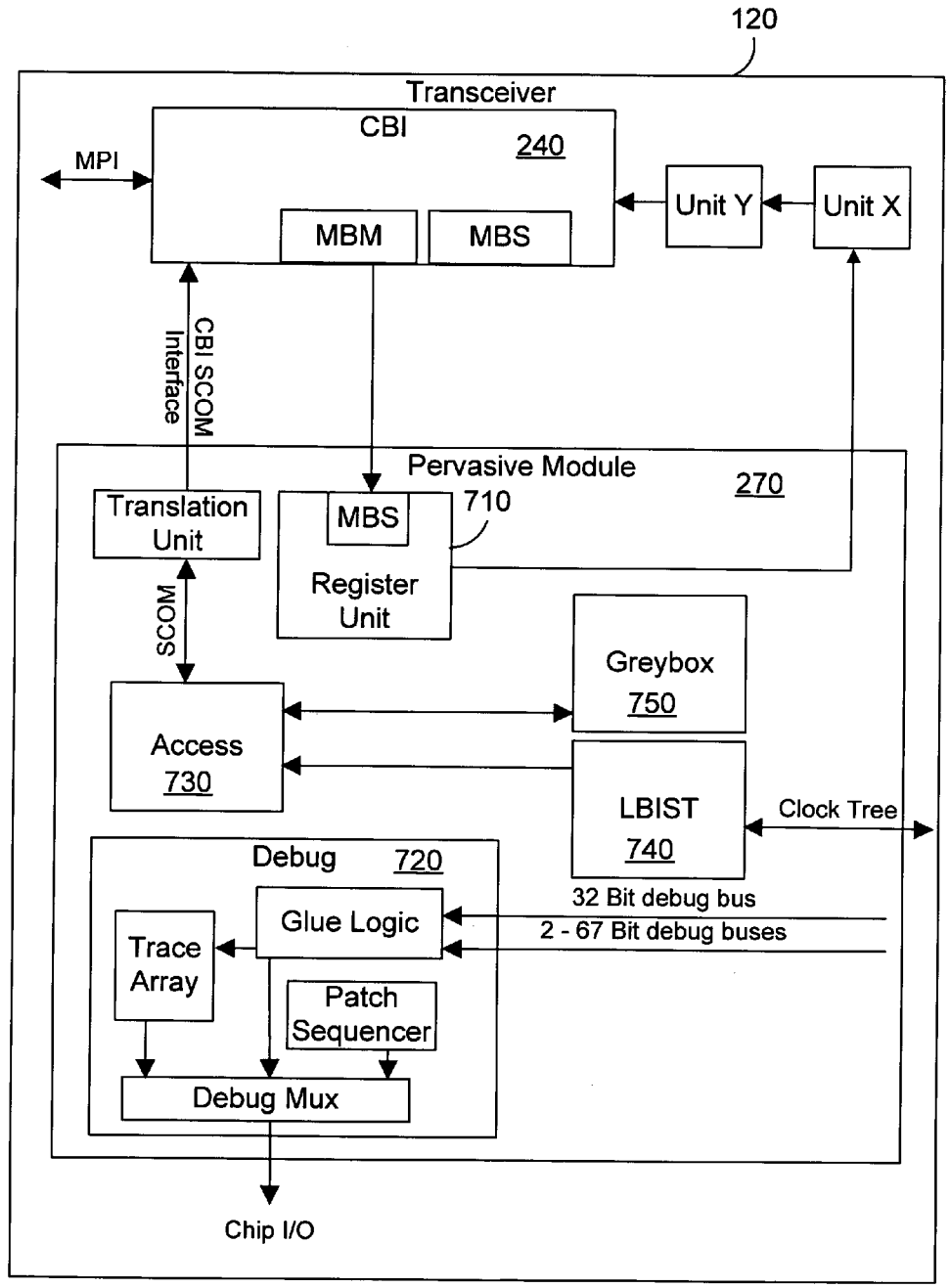
FIG. 7 is a block diagram of the pervasive module in accordance with the preferred embodiments.

FIG. 7 shows a block diagram of the pervasive logic 270. The Pervasive Unit consists of five main sub-units, Register unit 710, Debug 720, Access 730, LBIST (Logic Built In Self Test) 740, and Greybox 750. Each of these blocks are further described below.

Figure 8:
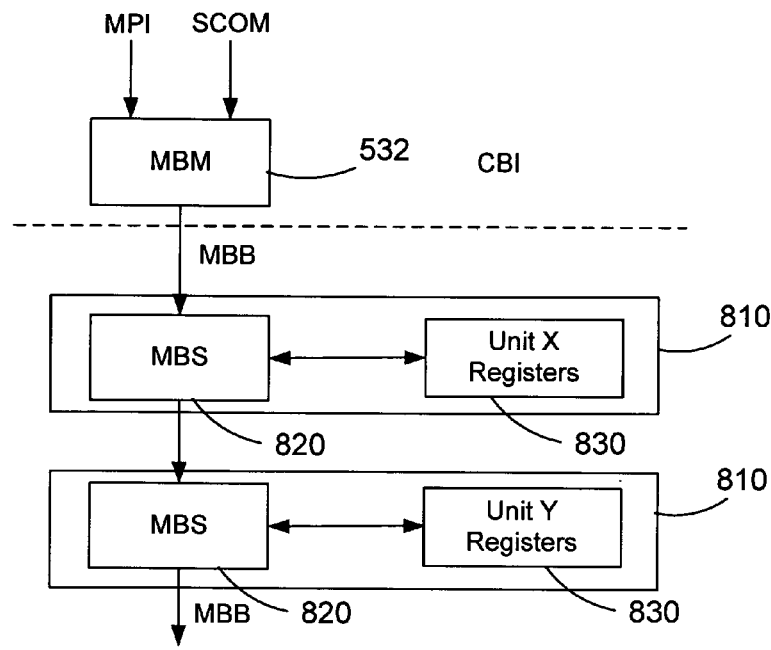
FIG. 8 is a block diagram of the debug bus in accordance with the preferred embodiments.

The register unit 710 contains miscellaneous registers for the entire chip, as well as Pervasive-related registers. The AMB, HT, and EI2 registers also reside within Pervasive. Any registers that do not belong to any particular unit reside in the Pervasive Register unit. In the bus transceiver 120, all chip registers are accessed through the MMIO Byte Bus (MBB). FIG. 8 shows a partial block diagram of the MBB. The MBB connects all chip units in a serial fashion. Each chip unit contains a Master Byte Bus Slave (MBS), which communicates on the MBB. The Pervasive Register unit 710 contains the first MBS in the ring, and interfaces directly to the Master Byte Bus Master (MBM) that resides in CBI 240. Each unit has its own address range, and monitors the control signals in the MBS.

Bus transceiver 120 has 20 General Purpose I/O (GPIO) pins. The GPIO are dedicated pins. The GPIO is hardware that allows a MBB write or read to bits from I/O, allowing the bus transceiver 120 to control the GPUL 110. The GPIO chip I/O from the bus transceiver 120 are connected to the GPUL 110 on the MCM 100. Power On Self Test (POST) is a method for external pins on the MCM to communicate with internal bus transceiver logic. The POST I/O is shared with the debug bus. There is 8 output POST signals, which shares I/O with the debug bus bits 0 to 7. There is 8 input POST signals, which shares I/O with the debug bus bits 8 to 15. Similar to GPIO, there is a register that captures the input data, and a register that drives the output data.

The Debug unit 720 is used to look at internal chip signals from chip I/O. A 32 bit bus connects to all logic partitions throughout the chip. Each partition has an internal mux that selects groups of signals to be displayed on the Debug chip I/O. Within the debug logic, there are three methods of selecting data from the debug bus to be placed on chip I/O. The debug unit 720 contains three main subunits connected together with some glue logic. The three units are debug mux, trace array, and a patch sequencer. The Debug function has the ability to trigger on and trace signals sent to it by the other logic partitions in the bus transceiver 120. The purpose is to provide a limited logic analyzer function for hardware debug. The Debug partition traces data by writing groups of internal signals to an on-chip register array, to external pins or both. The frequency of the external debug bus is 250 MHz.

FIG. 8 show a block diagram of the debug model. The Debug model incorporates a patch function, similar to triggers called the Patch Sequencer. If a specific condition is met on the debug bus, a signal can be asserted back to a partition, forcing the logic to take different action. The Debug model provides several mechanisms for reading data out of the trace array. The array is addressable from SCOM and processor through the MBB bus. The MBM (MMIO Byte Bus Master) is able to read and write the Trace Array read registers. The debug model can generate a test pattern for writing into the trace array or out to the debug pins. This can be a user specified (through a register) pattern, or a test pattern generated by the debug logic. The MBM 532 shown in FIG. 8 resides in the CBI 240 as shown in FIG. 5. The register ring blocks 810 represent the register rings 536 shown in FIG. 5. Each of the register ring blocks 810 have a MBS 820 and a ring of registers 830 that correspond to a register ring 536, 538 shown in FIG. 5.

Greybox, Access, and LBIST

Again referring to FIG. 7, the Pervasive unit contains the IP to control the manufacturing test and logic built in self test (LBIST) functions on the chip. The level sensitive scan design (LSSD) chains and LBIST rings are balanced and muxed in the greybox functional unit 750. There is a 248 channel LBIST 740 that resides in the pervasive module 270. Its channels are reasonably balanced. The Access unit 730 is a JTAG controller that interfaces with the greybox unit 750, system clocks, and the LBIST 740. The access unit 730 can stop functional clocks and control test clocks and data for chip test on the manufacturing floor.

Interrupt

Figure 9:
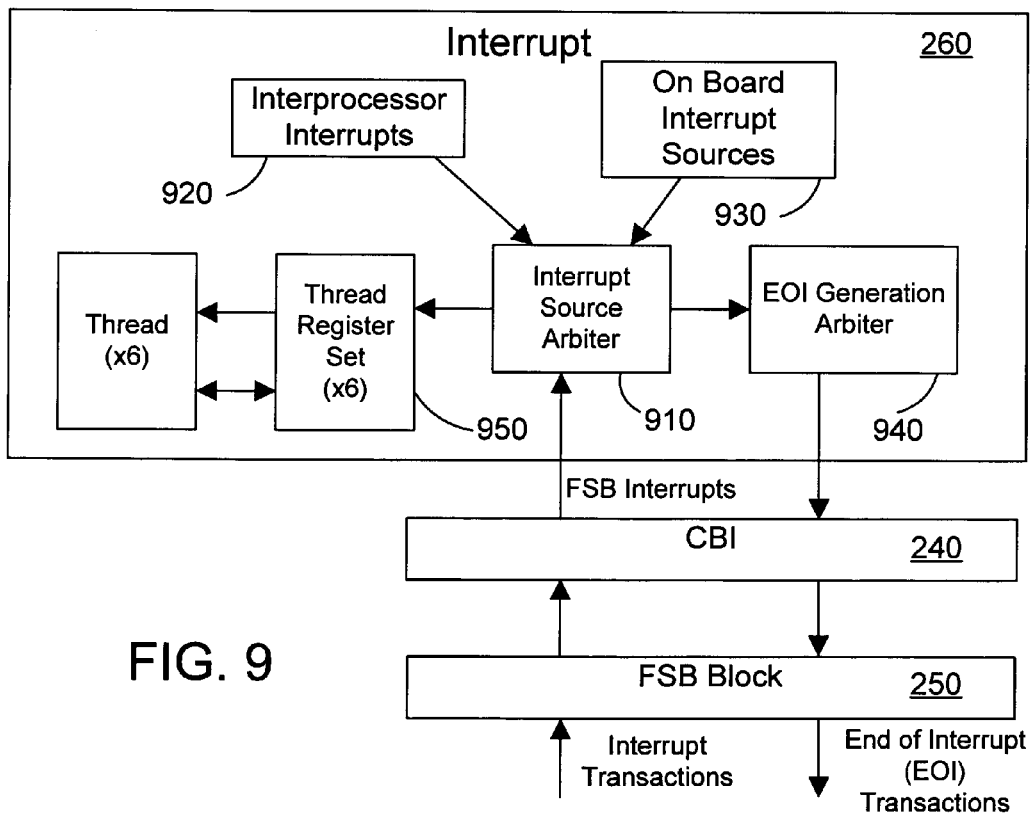
FIG. 9 is a block diagram of the interrupt module in accordance with the preferred embodiments.

FIG. 9 illustrates a block diagram of the interrupt block 260. The interrupt block 260 is a programmable interrupt controller that captures and filters the upbound interrupts, and uses information in the interrupt transactions to update the targeted thread's register set. If the incoming interrupt passes priority filtration, the external interrupt line is raised to the appropriate PBW thread. A separate CPU register store mechanism is provided for generation of inter-processor interrupts (IPI's) between PBW threads. The IPI mechanism also relies on raising the external interrupt input to the targeted thread. At the end of servicing a level-sensitive interrupt, a CPU thread generates an end of interrupt (EOI) transaction via a store to one of it's registers. The EOI is forwarded downbound over the FSB to external devices to re-enable level-sensitive interrupts.

The interrupt source arbiter 910 contains a common interrupt source handling front end to parse the three separate sources of incoming interrupts: (1) inter-processor interrupts 920, (2) front side bus 150 generated interrupts, and (3) miscellaneous onboard interrupt sources 930. The Logical ID registers for the threads will be used by the common interrupt source arbiter 930 to determine which thread(s) is/are targeted for the interrupt being currently handled. If the bitwise compare between the source destination ID and a particular LIDRn contents results in a nonzero value, that thread is considered to be a target and the appropriate thread Hit(0:5) bit is set for a given source.

An inter-processor interrupt (IPI) is generated by a single IPIGRn register write access. It is assumed that all register accesses from any thread are serialized at a common point prior to being sent around the register daisy-chain interface. In this way, there is at most one register access in flight at any one time. When any of the IPIGRn registers are written to, the register contents are updated and the write access is delayed by one clock before being input to the interrupt source arbiter. The register 4K page offset is used to select the appropriate IPIGRn contents for destination ID and vector.

Interrupts from the FSB block 250 are guaranteed to appear no more than every 3rd clock from the CBI interface 240 (i.e. there at least 2 null cycles between every back-to-back FSB interrupt). The incoming FSB interrupt is first latched, and then the destination ID is inspected to determine the target thread(s). The interrupt arbiter contains a 2-clock pipeline for the FSB interrupt contents to guarantee that it is not missed if the arbiter is servicing a different interrupt source.

The miscellaneous onboard interrupts are discrete inputs that are parameterized by the set of MIGRm registers. When any of the onboard interrupt discreets are activated, the level/edge detection logic senses this and latches this state. The level/edge detection logic also contains a round-robin pointer that selects which of the asserted discrete inputs may drive a request (valid signal) to the interrupt source arbiter 910. The contents of the appropriate MIGRM (as determined by the pointer) for destination ID, vector, and trigger mode are muxed into the interrupt source arbiter 910. The interrupt source arbiter 910 pulses an ack signal to the level/edge detect circuit when the interrupt has been forwarded to the appropriate thread(s). The ack signal causes the round-robin pointer to increment to the next asserted input where it stays until the next ack occurs.

The interrupt source arbiter 910 contains a 4-state sequencer that moves from idle to an ack state for one clock, then back to idle. The ack state chosen depends on a prioritization of pending interrupts from the 3 sources. The highest priority is the FSB generated interrupts, followed by the IPI's, followed by the MIGRm interrupts. While in a given ack state, the sequencer pulses a valid signal to the targeted thread(s), and controls the multiplexing of the chosen input source vector and flag to the appropriate thread(s). An external source (FSB) indication flag is also given to the thread(s). This allows the thread to determine if it's ITMRn register should be updated. The interrupt source arbiter 910 contains a 2-clock pipeline for the FSB interrupt contents to guarantee that it is not missed if the arbiter is servicing a different interrupt source. The IPI input source to the interrupt source arbiter 910 is latched until it can be forwarded to the destination thread(s) and, at this point, the EPI register access is allowed to complete.

The End of Interrupt (EOI) generation arbiter 940 controls the arbitration between the seven sources for outgoing end of interrupt transactions: the six thread register sets 950, and the test EOI generation register (not shown). An EOI sequence is initiated in response to either a store to the EOI/EOIA registers (not shown), or a store to the test EOI generation register. A fair, round-robin arbitration scheme is used to select between the sources of EOI's. The EOI generation arbiter 940 consists of 2 simple state machines and a source pointer. The EOI transaction flow is a 3-stage pipelined queue. Each thread set contains an EOI output latch (stage 1) that holds the transaction until it can be accepted into the EOI generation arbiter 940 input latch for that thread (stage 2). The initiating EOI/EOIA store is allowed to complete at this time. The input transaction is held in the input latch until the such time as the EOI generation arbiter 940 pointer transitions to this source and the input sequencer determines that this transaction can be moved to the CBI output latch. While in the input sequencer idle state, the pointer is allowed to freely circulate. The output sequencer simply pulses the EOI valid signal to the CBI when the output latch contains valid contents and an unused CTS credit is owned.

The embodiments described herein provide important improvements over the prior art. The preferred embodiments will provide the computer industry with a high speed interface for an existing computer architecture for an overall increase in computer system performance.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the preferred embodiments are discussed herein with particular regard to multi-chip modules, the computer system and methods of the preferred embodiments may be applied to any semiconductor computer system architecture including a single chip computer system.

What is claimed is:

1. A computer processor system comprising:
   a processor with a processor bus;
   a bus transceiver comprising:
   an elastic interface to provide a physical link from the transceiver to the processor bus;
   a bus bridge to bridge between the processor bus and a second bus;

a common bus interface to interface between the processor bus and a front side bus (FSB) block connected to the output bus;
an interrupt block;
a pervasive logic block;
an output bus;
wherein the FSB block of the transceiver further comprises;
a transaction layer;
a link layer;
a glue layer;
a physical layer; and
wherein the bus transceiver translates commands, data, and snoop transactions from the processor bus to the output bus protocols and from the output bus to the processor bus protocols.

2. The computer processor system of claim 1 wherein the processor core and the bus transceiver are separate chips integrated together on a multi-chip module.

3. The computer processor system of claim 1 wherein the bus bridge of the transceiver farther comprises:
an processor bus to second bus command and data conversion unit;
a second bus to processor bus command and data conversion unit; and
a snoop response unit.

4. The computer processor system of claim 1 wherein the common bus interface of the transceiver further comprises:
a multiprocessor interface (MPI) unit that provides interconnection between the bus bridge and the common bus interface;
a bus interface unit that processes commands from the FSB block and the interrupt block;
a register interface unit that accepts commands from the pervasive logic and delivers them to a register ring; and
a pervasive interface (PIU) unit that provides additional pervasive functions including RAS (Reliability, Availability, and Serviceability) support.

5. The computer processor system of claim 1 wherein the glue layer of the FSB block farther comprises:
a receive elastic interface;
an upbound bandwidth matcher; and
a downward bandwidth matcher.

6. The computer processor system of claim 1 wherein the physical layer of the FSB block farther comprises:
a hypertransport receive core; and
a hypertransport transmit core.

7. The computer processor system of claim 5 wherein the receive elastic interface further comprises:
a circular buffer that performs asynchronous handshaking between out of phase clock domains;
a read pointer that defines the output entry in the circular buffer; and
a write pointer that defines the input data entry for the circular buffer.

8. The computer processor system of claim 5 wherein the upbound bandwidth matcher takes sixteen bytes of data at 125 MHz and converts it to eight bytes at 250 MHz.

9. The computer processor system of claim 5 wherein the downward bandwidth matcher takes eight bytes at 250 MHz and converts it to sixteen bytes of data at 125 MHz.

10. The computer processor system of claim 6 wherein the hypertransport receive core and the hypertransport transmit core are compliant with the HyperTransport I/O Link Specification, Revision 1.5.

11. A computer game processor system comprising:
a processor with an advanced processor interface (API) bus;
a bus transceiver comprising:
an elastic interface to provide a physical link from the transceiver to the API bus;
a bus bridge to bridge between the API bus and a MPI bus;
a common bus interface to interface between the MPI bus and an FSB block connected to the output bus;
an interrupt block;
a pervasive logic block; and
an output bus coupled to an input bus of a graphics processor unit, wherein the bus transceiver provides a bus conversion between the API bus and the output bus.

12. The computer processor system of claim 11 wherein the processor core and the bus transceiver are separate chips integrated together on a multi-chip module.

13. The computer processor system of claim 11 wherein the bus bridge of the transceiver further comprises:
an API to MPI command and data conversion unit;
a MPI to API command and data conversion unit; and
a snoop response unit.

14. The computer processor system of claim 11 wherein the common bus interface of the transceiver further comprises:
a MPI unit that provides interconnection between the bus bridge and the common bus interface;
a bus interface unit that processes commands from the FSB block and the interrupt block;
a register interface unit that accepts commands from the pervasive logic and delivers them to a register ring; and
a PIU unit that provides additional pervasive functions including RAS (Reliability, Availability, and Serviceability) support.

15. The computer processor system of claim 11 wherein the FSB block of the transceiver further comprises:
a transaction layer;
a link layer;
a glue layer; and
a physical layer.

16. The computer processor system of claim 15 wherein the glue layer of the FSB block further comprises:
an receive elastic interface;
an upbound bandwidth matcher; and
a downward bandwidth matcher.

17. The computer processor system of claim 15 wherein the physical layer of the FSB block further comprises:
a hypertransport receive core; and
a hypertransport transmit core.

18. The computer processor system of claim 16 wherein the receive elastic interface further comprises:
a circular buffer that performs asynchronous handshaking between out of phase clock domains;
a read pointer that defines the output entry in the circular buffer; and
a write pointer that defines the input data entry for the circular buffer.

19. The computer processor system of claim 16 wherein the upbound bandwidth matcher takes sixteen bytes of data at 125 MHz and converts it to eight bytes at 250 MHz.

20. The computer processor system of claim 16 wherein the downward bandwidth matcher takes eight bytes at 250 MHz and converts it to sixteen bytes of data at 125 MHz.

21. The computer processor system of claim 17 wherein the hypertransport receive core and the hypertransport transmit core are compliant with the HyperTransport I/O Link Specification, Revision 1.5.

22. A computer game processor system comprising:
    a processor with an API bus;
    a bus transceiver that comprises:
        an elastic interface to provide a physical link from the transceiver to the API bus;
        a bus bridge to bridge between the API bus and a MPI bus;
        a common bus interface to interface between the MPI bus and a FSB block that is connected to an output bus;
        an interrupt block;
        a pervasive logic block; and
    an input bus of a graphics processor unit coupled to the output bus, wherein the bus transceiver provides a bus conversion between the API bus and the output bus.

23. The computer processor system of claim 22 wherein the processor core and the bus transceiver are separate chips integrated together on a multi-chip module.

24. The computer processor system of claim 22 wherein the bus bridge of the transceiver further comprises:
    an API to MPI command and data conversion unit;
    a MPI to API command and data conversion unit; and
    a snoop response unit.

25. The computer processor system of claim 22 where in the common bus interface of the transceiver further comprises:
    a MPI unit that provides interconnection between the bus bridge and the common bus interface;
    a bus interface unit that processes commands from the FSB block and the interrupt block;
    a register interface unit that accepts commands from the pervasive logic and delivers them to a register ring; and
    a PTU unit that provides additional pervasive functions including RAS (Reliability, Availability, and Serviceability) support.

26. The computer processor system of claim 22 wherein the FSB block of the transceiver further comprises:
    a transaction layer;
    a link layer;
    a glue layer; and
    a physical layer.

27. The computer processor system of claim 26 wherein the glue layer of the FSB block further comprises:
    an receive elastic interface;
    an upbound bandwidth matcher; and
    a downward bandwidth matcher.

28. The computer processor system of claim 26 wherein the physical layer of the FSB block further comprises:
    a hypertransport receive core; and
    a hypertransport transmit core.

29. The computer processor system of claim 27 wherein the receive elastic interface further comprises:
    a circular buffer that performs asynchronous handshaking between out of phase clock domains;
    a read pointer that defines the output entry in the circular buffer; and
    a write pointer that defines the input data entry for the circular buffer.

30. The computer processor system of claim 27 wherein the upbound bandwidth matcher takes sixteen bytes of data at 125 MHz and converts it to eight bytes at 250 MHz.

31. The computer processor system of claim 27 wherein the downward bandwidth matcher takes eight bytes at 250 MHz and converts it to sixteen bytes of data at 125 MHz.

32. The computer processor system of claim 28 wherein the hypertransport receive core and the hypertransport transmit core are compliant with the HyperTransport I/O Link Specification, Revision 1.5.

* * * * *